United States Patent Office 3,198,456
Patented Aug. 3, 1965

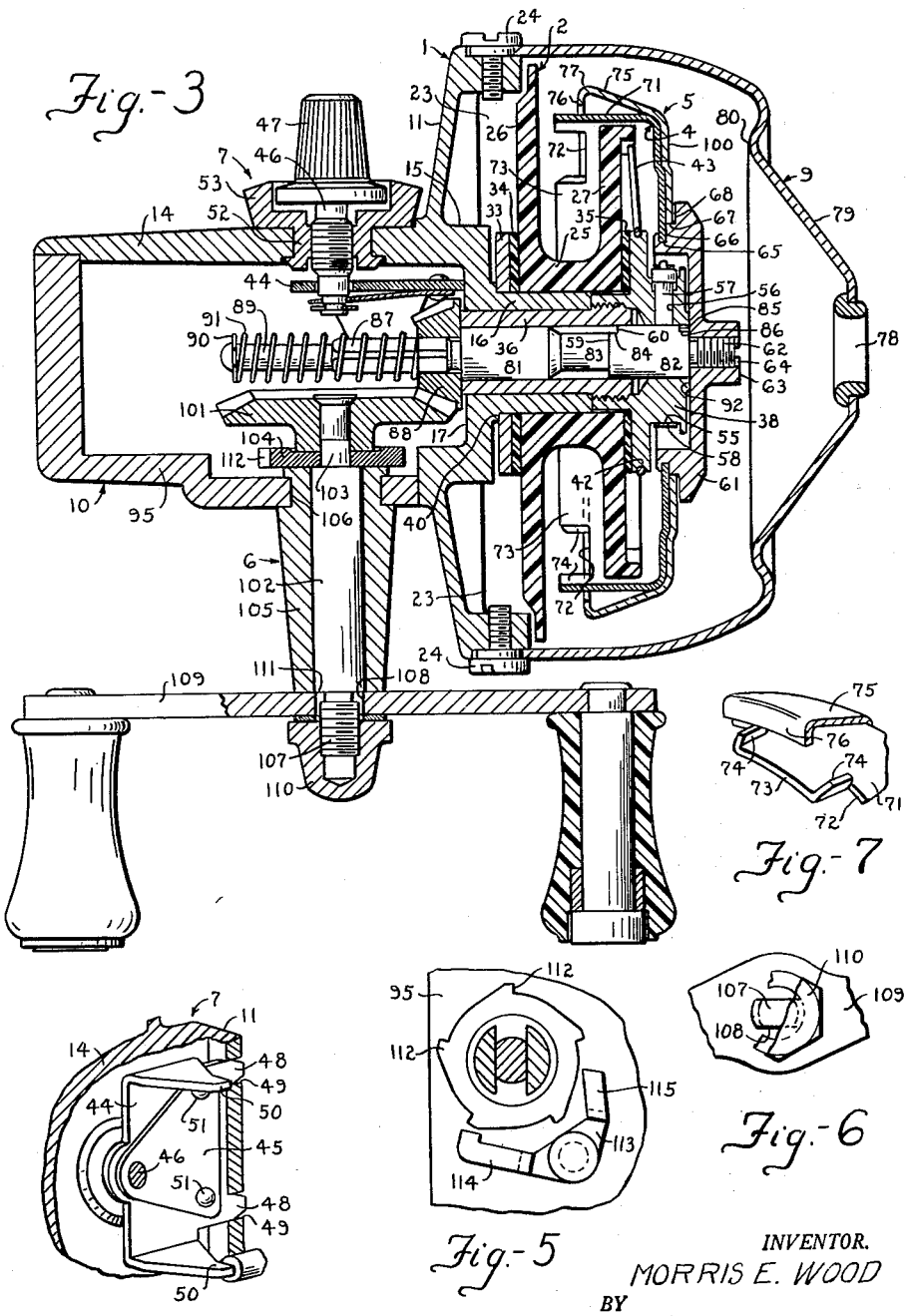

3,198,456
SPINNING REEL
Morris E. Wood, Bronson, Mich., assignor, by mesne assignments, to Bronson Specialties, Inc., Bronson, Mich., a corporation of Michigan
Continuation of application Ser. No. 661,760, May 27, 1957. This application Oct. 31, 1961, Ser. No. 150,614
12 Claims. (Cl. 242—84.2)

This is a continuation of application Serial No. 661,760, filed May 27, 1957, now abandoned.

The invention relates generally to fishing reels and more particularly is directed to reels known as the spinning type.

One of the principal objects of the invention is to provide a reel of the spinning type in which the line is guided axially onto and off a spool in a manner whereby to prevent the line from twisting. In other words, provision is made for complete control of the line to maintain it in a normal condition within the confines of the reel to avoid snarling or entanglements with any of the internal fixed or movable components of the reel structure.

The reel embodying the invention includes, among other things, a spool, a line pickup, operating means for imparting relative rotational movement between the spool and pickup to direct a line onto the spool, a pair of axially disposed clamping elements, and actuating means for imparting relative axial movement between the clamping elements for braking the movement of the line between the elements when the line is being pulled from the reel. One of the clamping elements is preferably made in the form of a movable brake drum located forwardly of the spool and a stationary case or shell enclosing the spool and pickup preferably constitutes the other clamping element.

More specifically, an object of the invention is to mount the brake drum in a manner whereby it may be revolved with respect to the pickup and the stationary cover to brake movement of the line when the line is being pulled from the reel. The arrangement is such that the drum and cover constituting the clamping elements are operatively related so as to provide a "feathering" or graduated line controlling means, thereby eliminating the sudden or too abrupt braking action usually present in reels of the spinning type.

An important object of the invention is to provide means for imparting relative axial movement between the spool and the pickup to render the pickup and the drum as a unit inoperative in order to permit the line to unwind from the spool as desired when a cast is made. The organization is preferably such that the line in a casting operation will run radially outward from the spool and over the drum as distinguished from riding over any frontal flange or portion of the pickup.

Another important object of the invention is to provide the cover with a line guide in front of the brake drum and an annular braking surface surrounding the opening which is adapted to be engaged by the brake drum when the latter is moved forwardly by the actuating means.

A further object of the invention is to provide means for holding the pickup and drum as a unit in a forward or inoperative position between the spool and the braking surface on the cover, which means is automatically operable to return the unit to an operative position so that the pickup will direct a line onto the spool when the driving means of the reel is rotated in a line winding direction.

A significant object of the invention is to provide improved means for mounting the spool so that it is held substantially against axial displacement but may be rotated by the outward pull of a line when desired. More particularly in this regard, the objective is to provide a novel setup whereby a dragging action may be applied to the spool to stop or control its rotative movement to retard release of the line therefrom. This dragging action is adapted to be applied to the spool independently of the braking action afforded by the clamping elements above referred to.

A specific object of the invention is o provide a driven shaft which carries the pickup and drum unit and provide a novel way of detachably connecting the unit to the shaft.

Another object of the invention is to provide a unique click mechanism operatively associated with the spool for signalling or indicating when the spool rotates.

A particular object of the invention is to provide the pickup with straight axially disposed fingers and form the fingers and material of the pickup adjacent the fingers in such a manner that the wear of a line riding thereon is reduced to a minimum.

Other objects and advantages of the invention will become apparent after the description hereinafter set forth is considered in conjunction with the drawings annexed hereto.

In the drawings wherein a preferred embodiment of the reel is exemplified:

FIGURE 3 is a horizontal section of the reel;

FIGURE 4 is a partial section showing certain details of the drag means;

FIGURE 5 is a view with portions in section depicting the ratchet mechanism;

FIGURE 6 is a partial view showing a part of the driving means and particularly the mode of attaching a crank to a shaft; and FIGURE 7 is a partial perspective view illustrating details of the pickup.

Figure 1:
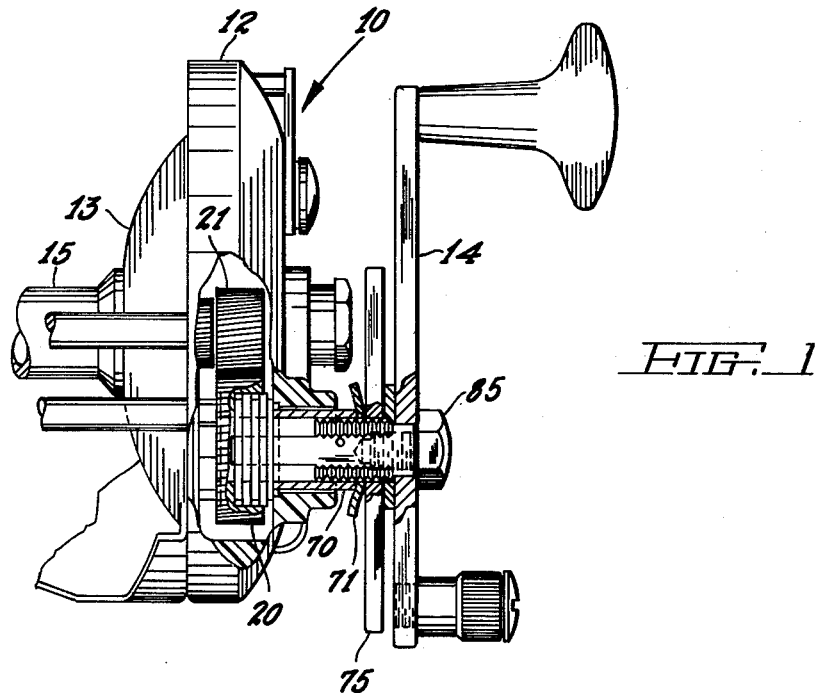
FIGURE 1 is an elevational side view of the reel with portions broken away and in section to illustrate the internal structure thereof.
Figure 2:
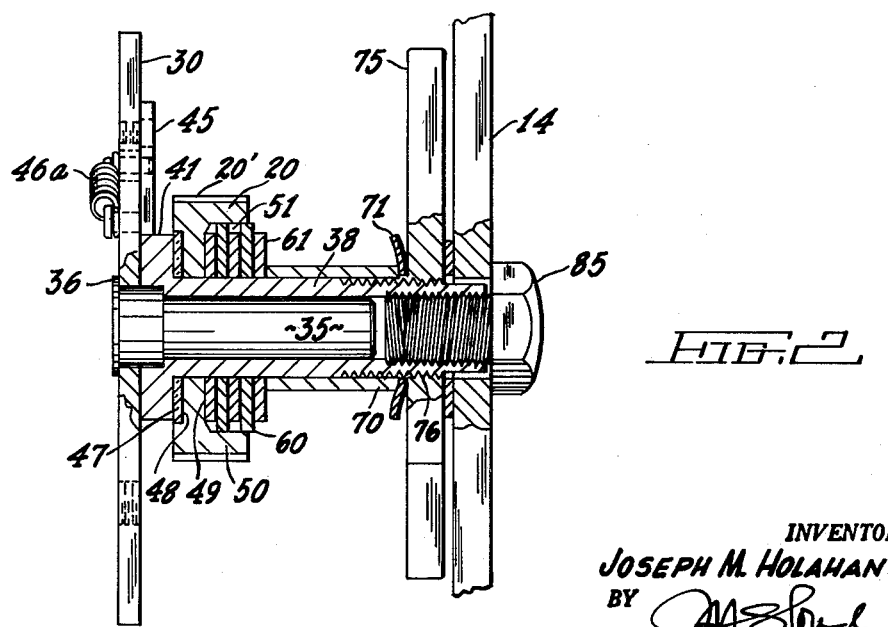
FIGURE 2 is a transverse vertical section of the reel with portions broken away to exemplify certain details of the pickup, drum, holding means and the click mechanism.

Referring generally to the reel structure exemplified in FIGURES 1 and 3 of the drawing, numeral 1 designates a frame, 2 a spool, 3 a rotatable driven shaft, 4 a line pickup mounted for rotative and axial movement relative to the spool, 5 a brake drum rotatably mounted with respect to the fore end of the shaft, 6 operating or driving means for driving the driven shaft and pickup as a unit, 7 means for actuating drag means associated with the spool, 8 manual actuating means for imparting relative axial movement between the spool and the unit, 9 a cover or shell connected to the frame for covering the components in front of the frame, and a closure 10 cooperating with the frame for covering those components at the rear thereof.

The reel frame 1 is preferably cast or moulded from a suitable material and, among other things, includes an upstanding wall 11, rearwardly extending top and bottom walls 12 and 13 and a side wall 14. The wall 11 is formed to include a centrally disposed formation 15 provided with a forwardly extending tubular support 16 and a recess 17 at the rear side of the wall. The wall 11 is further provided with an inset forwardly extending rim 18 on which the cover 9 is detachably mounted. The frame also includes a depending offset 19 having a longitudinal portion 20 provided with a concave seat in which a plate 21 is secured by rivets 22 for attaching the reel to a pole or rod to place the longitudinal axis of the reel in parallel relation to the longitudinal axis of the pole or rod. It will be noted that the wall 11 and the formation 15 are preferably reinforced by radial webs 23. The rim 18 is preferably thickened at diametrically spaced locations and provided with threaded apertures within which pered cylindrical portion 75 surrounding the pickup and an inturned annular radial flange 76 having its edge engaging the rounded projection 74 and disposed in close proximity to the cylindrical wall of the pickup at a location whereby the flange lies in a plane slightly to the rear of the plane formed by circumferential edge portions of the notches 72 in the pickup so that the line will engage the flange when directed onto the spool or released therefrom. Thus, the projections 74 on the pickup and the flange 76 serve to guide the line with respect to the spool. It will be noted that the drum further includes a convex portion 77 which joins the tapered cylindrical and flange portions thereof and that the line rides primarily on this convex portion including the tapered portion when the line travels in either direction through an eyelet guide 78 carried at the apex of the cover 9. Attention is also directed to the important fact that when the pickup and drum unit are shifted to the forward full line position shown in FIGURE 1 or there beyond the line will ride over the forward flange 27 of the spool and the convex portion 77 of the drum and avoid engaging the pickup. The line thus bypasses the pickup when the unit is moved forwardly a predetermined distance to permit free release of the line when a cast is made. Of further importance is the fact that when the line pickup is in the aforesaid forward position the line may cause the drum to rotate relative to the pickup and thereby reduce line wear on those portions of the parts which are engaged by the line. The eyelet has an inner smooth annular bearing surface which is preferably disposed axially inward a sufficient distance to more or less maintain the line in spaced relation to a converging or conical portion 79 of the cover and thereby reduce line friction to a minimum. The cover is also provided with an annular braking surface 80 for engagement with the drum 5 as will be explained later.

The driven shaft 3 and mode of mounting it will now be described. The shaft includes a pair of axially spaced cylindrical portions 81 and 82 joined by an intermediate reduced cylindrical portion 83. The portions 81 and 82 are supported and journalled in the tubular bearing 36 and nut 38. The portion 82 of the shaft is provided with a flat 84 adjacent the abutment 60 which assists in releasing the pickup and drum unit from a forward position back to a line directing position. The portion 82 is further provided with an abutment 85 and a flat 86 which are spaced longitudinally forward from the abutment 60 and flat 84, all of which will be explained in detail subsequently.

The shaft also comprises an elongated spindle portion extending rearwardly from the tubular bearing 36. This spindle is formed to include a squared portion 87 extending through a squared opening provided in a pinion gear 88 for keying the gear for rotation therewith and slidable movement thereon. The spindle also includes a reduced end portion 89 constituting a continuation of the squared portion and the end of this reduced portion is provided with an annular groove within which an abutment preferably in the form of a split washer 90 is detachably secured for holding an elongated helical spring 91 on the spindle between the washer and gear in a manner whereby the gear is normally urged forwardly against the bearing and the shaft with the unit thereon in a rearward direction so the carrier will be held against a boss 92 formed on the front side of the nut 38 to locate the unit in an operative position for directing the line onto the spool. The boss reduces friction between the carrier 61 and the nut or fitting 38.

The actuating means 8 for shifting or moving the shaft 3, pickup 4 and drum as a composite unit forwardly and the relationship of the spring pressed pin 57 with the shaft for holding and releasing purposes will now be described. The actuating means preferably includes an actuator 93 which is mounted on a pivot screw 94 carried by the side wall 14 of the frame 1 and a side wall 95 of the closure 10. The actuator is preferably constructed from a suitable plastic material with a portion thereof disposed between the side walls 14 and 95 for guidance and an exposed ribbed or corrugated traction portion for manual engagement by a digit of the hand, such as the thumb. The inner portion of the actuator is provided with a leaf spring or abutment 96 secured thereto by a screw 97. The contour of the inner portion of the actuator and the spring is such that when the actuator is depressed about the pivot screw the spring backed on the actuator will cam the shaft 3 forwardly. The spring also serves to reduce vibration or rattle between the parts. The end of the spring 96 adjacent the pivot screw 94 is preferably disposed between a pair of abutments 98 to assist in preventing rotation of the spring about the screw 97. The helical spring 91 on the shaft also serves to urge a rounded end of the shaft against the leaf spring 96 and an edge 99 of the actuator against the upper wall 12 of the frame to normally maintain the actuator in an upper inoperative position as shown in dash lines in FIGURE 1.

More particularly, when the composite unit comprising the shaft 3, pickup 4 and drum 5, are moved a predetermined distance forwardly by the actuator from the line winding operative position illustrated in FIGURE 3, the spring pressed pin 57 will ride off the cylindrical portion 82 of the shaft and snap against the reduced portion 83 of the shaft and then against the shoulder 59 when the pressure on the actuator is removed. The unit is thus held in a forward position, rendering the pick inoperative so that when a cast is made the line will be pulled off the spool and out through the guide 78 over the drum 5. The unit may be readily returned to the position in FIGURE 3 by merely rotating the unit in a line winding direction until the pin is opposite the flat 84, in which event, the pressure exerted by the spring 91 will urge the unit rearwardly so that the pin will engage the flat 84 and abutment 60 and then ride out and upon the cylindrical portion 82 of the shaft to release the pin, whereupon the unit is automatically returned to the aforesaid position through the action of the spring. In some instances, when the unit is shifted forwardly, the pin will engage the flat 84 and abutment 60 in lieu of engaging the abutment 59 to hold the unit at a slightly shorter distance in advance of the spool, in which event, rotation of the unit will allow the pin 57 to ride onto the cylindrical portion 82 of the shaft and thereby cause the spring to retract the unit to a line winding position.

As alluded to above, the shaft 3 is provided with an abutment 85 and a flat 86. These cooperate and define a notch and serve to facilitate installation of the shaft. More specifically in this regard, when the shaft is being inserted forwardly into the bearing 36 it is stopped by the pin 57, but when the shaft is manipulated so that the pin will register with the notch to engage the flat and then rotated the pin will ride onto the cylindrical portion 82 of the shaft, whereupon the shaft can be pushed forwardly through the bearing so that the drum and pickup unit can be attached to its forward end.

Attention is further directed to the fact that the unit may be moved forwardly in advance of either of the positions above referred to so as to press an annular braking surface 100 on the brake drum against the braking surface 80 on the cap 9 for preventing or retarding release of the line from the spool when a cast is made. This braking action is applied to the line independently of the drag or braking means applied to the spool for controlling release of the line from the spool as desired.

The driving or operating means 6, which will now be described, includes a drive gear 101 which is keyed to a drive shaft 102 and meshes with the pinion gear 88. The drive gear is preferably keyed to the drive shaft by providing the shaft with a squared portion 103 which engages a squared opening in the gear. The squared portion also engages a squared opening in a ratchet wheel 104 for keying the latter for rotation with the shaft. The drive shaft is journalled in a tubular staff or bearing 105 having an inner reduced end which extends through an opening 106 in the side wall 95 of the closure 10 and is upset to secure the bearing thereto. The ratchet wheel is interposed between the gear and the upset end of the bearing. The outer end of the shaft is provided with a squared and threaded portion 107 which extends through a squared aperture 108 in a crank 109 for keying the crank to the shaft and a cap nut 110 connects with the threaded portion for holding the crank and a washer between the crank and nut on the shaft. It will be noted that the crank bears against a shoulder 111 on the shaft so that when the nut is tightened the crank will not bind on the bearing. Handles are carried by the crank to facilitate rotation of the crank.

The ratchet wheel is provided with a plurality of teeth 112 and a pawl 113 is pivotally secured to the closure. The pawl is provided with a pair of angularly disposed legs 114 and 115 which are so designed and constructed with respect to the teeth that either leg will cooperate with a tooth to prevent reverse rotation of the ratchet, shaft, drive gear and the pickup and driven unit whenever one's hand is released from the crank after turning same for rotating the unit in a line winding direction.

Having thus described my invention, it is obvious that various modifications may be made in the same without departing from the spirit of the invention, and, therefore, I do not wish to be understood as limiting myself to the exact forms, constructions, arrangements, and combinations of parts herein shown and described.

I claim:

1. A reel comprising a frame, a line support mounted at the front side of the frame, a rotary shaft extending through the support, a line pickup mounted for movement with the shaft, said line pickup having a cylindrical wall provided with means for engaging and directing the line onto the support, a pair of relatively movable annular members mounted in opposed relation in front of the pickup, means for rotating the pickup, means for imparting relative axial movement between the members for snubbing the line therebetween, and one of said members being freely rotatable relative to the pickup and shaft and provided with a wall portion surrounding said pickup for engaging and substantially preventing the line from engaging an external surface of the cylindrical wall of said pickup.

2. A spinning reel comprising a frame, a line support mounted at the front side of the frame, a rotary shaft extending through the frame and support, a cup-shaped element mounted on the shaft and provided with an annular wall, a line pickup mounted for movement with the shaft and disposed in and coaxial with said element with the wall of the latter overlying a portion of the pickup, driving means for rotating the pickup and element in one direction to cause the pickup to deliver line onto the support while said line rides on the element, and lever means for shifting the rotary shaft, pickup and element as a unit forwardly of the line support to place the pickup and element in a position whereby the line may move freely off the support while riding on the element.

3. A subassembly for a spinning reel, said subassembly comprising a driven shaft, a single plate-like mounting element secured to said shaft, a cup-shaped frontal member secured to the mounting element for rotation with respect thereto and having an annular portion for engaging a line, a rear annular member fixed on the mounting element for movement therewith and received in said frontal member, and means on said rear member for directing a line onto a receiver therefor.

4. A reel comprising a spool, a line pickup having a cylindrical wall and means extending rearwardly therefrom for engaging a line, a cover disposed over the pickup and having an opening for the line, means for imparting relative rotational movement between the pickup and spool to cause said means on said pickup to direct the line onto the spool, an element located in front of the spool and having an annular flange surrounding at least a portion of the pickup and closely associated with said rearwardly extending means for engagement by the line in a manner whereby to facilitate directing the line onto and off the spool and prevent the line from substantially engaging an external surface of the cylindrical wall of said pickup, and means for moving the element forwardly to clamp the line between said cover and element.

5. A spinning reel comprising a spool, a rotatable mounting, a line pickup fixed on said mounting for rotation therewith for directing line onto the spool, a brake element secured for rotation with the mounting and having an annular flange disposed about a part of the pickup, said element also being rotatable with respect to said mounting through the action of the line and having a braking surface spaced from the flange, a member disposed forwardly of the mounting, means for rotating the mounting so that a line will ride over the annular flange and the pickup will direct the line onto the spool, lever means for moving the mounting forwardly to place the braking surface of the brake element in close proximity to the member for retarding unwinding movement of the line from the spool, and means spaced from the mounting for automatically temporarily detaining said mounting in a forward position.

6. The reel defined in claim 1, including means for shifting the shaft, pickup and rotatable member as a unit forwardly to a predetermined position relative to the line support, and means for automatically temporarily detaining this unit in said position until released.

7. A spinning reel comprising a frame provided with a forwardly extending tubular support and a pair of rearwardly extending tubular formations, a spool mounted on said support, means securing the spool on said support, front and rear friction means disposed on opposite sides of said spool, a driven shaft extending through said support, a fitting secured to the fore end of said shaft, a line pickup secured to said fitting, a pinion carried by said driven shaft, a drive shaft having a gear meshing with said pinion, means associated with said drive shaft for limiting its rotation and that of said driven shaft and pickup to a line winding direction, a pair of pins slidably disposed in said tubular formations, a plate secured to the fore ends of said pins and interposed between said frame and said rear friction means, a manual control carried by said frame, and means operatively connecting said control and said pair of pins for clamping the spool between said friction means.

8. The reel defined in claim 7 in which the driven shaft is provided with abutment means and the securing means is provided with spring pressed means for engaging said abutment means when the driven shaft and pickup are shifted forwardly as a unit relative to said spool, and means for shifting said unit.

9. A reel comprising a frame, a line support mounted at the front side of the frame, a rotary shaft extending through the support, a line pickup mounted for movement with the shaft, said line pickup having a cylindrical wall and provided with means for engaging and directing the line onto the support, a cover carried by said frame and provided with an inturned annular portion, a movable annular member mounted in front of the pickup in opposed relation to said annular portion, means for rotating the pickup, and means for moving said annular member forwardly for snubbing the line between said annular portion and said annular member, said annular member also being freely rotatable relative to the pickup and shaft and provided with a wall portion surrounding said pickup for engaging and substantially preventing the line from engaging the cylindrical wall of said pickup.

10. A spinning reel comprising a frame provided with a forwardly extending tubular formation, a tubular bearing secured in said tubular formation, a line support mounted on said tubular formation at the front side of the frame, a nut carried by said tubular bearing for holding said support on said tubular formation, a rotary shaft extending through said tubular bearing and support and provided with an abutment, a cup-shaped element mounted on the shaft and provided with an annular wall, a line pickup mounted for movement with the shaft and disposed in and coaxial with said element with the wall of the latter overlying a portion of the pickup, driving means for rotating the pickup and element in one direction to cause the pickup to deliver line onto the support while said line rides on the element, means for biasing the rotary shaft, pickup and element as a unit rearwardly, lever means for shifting the unit forwardly to a predetermined position to place the pickup and element in a position whereby the line may move freely off the support while riding on the element, means carried by said nut for automatically engaging said abutment for detaining the unit in said predetermined position, and means carried by said shaft for automatically rendering said detaining means inoperative to release said unit from said predetermined position for retraction by said biasing means.

11. A subassembly for a spinning reel, said subassembly comprising a driven shaft, a single plate-like mounting element secured to said shaft, a cup-shaped frontal member secured to the mounting element for rotation with respect thereto and having a tapered annular portion for engaging a line, a rear annular member fixed on the mounting element for movement therewith and received in said frontal member, and said rear member having an annular wall provided with a plurality of circumferentially spaced elongate line receiving notches with out-turned projections at the ends of the notches for engaging and directing the line relative to a receiver therefor.

12. A spinning reel comprising a spool, resilient means for normally maintaining the spool in a stationary position, a rotatable shaft, a mounting carried by said shaft for rotation therewith, a line pickup fixed on said mounting for rotation therewith for directing line onto the spool, a brake element secured for rotation with the mounting and having an annular flange disposed about a part of the pickup, said element also being rotatable with respect to said mounting through the action of the line and having a braking surface spaced from the flange, a member disposed forwardly of the mounting, means for rotating the mounting so that a line will ride over the annular flange and the pickup will direct the line onto the spool, lever means for moving the mounting forwardly to place the braking surface of the brake element in close proximity to the member for retarding unwinding movement of the line from the spool, and means spaced from the mounting for automatically temporarily detaining said mounting in a forward position.

References Cited by the Examiner

UNITED STATES PATENTS

| | | | |
|---|---|---|---|
| 2,613,468 | 10/52 | Hand | 242—84.21 |
| 2,627,383 | 2/53 | Tibbetts | 242—84.2 |
| 2,675,975 | 4/54 | Ferguson | 242—84.2 |
| 2,745,607 | 5/56 | Taggart | 242—84.5 |
| 2,834,559 | 5/58 | Nagy | 242—84.21 |
| 2,929,578 | 3/60 | Hull | 242—84.2 |

FOREIGN PATENTS 916,877    8/46    France.

MERVIN STEIN, *Primary Examiner.*

HARRISON R. MOSELEY, RUSSELL C. MADER,
*Examiners.*

INVENTOR.
JOSEPH M. HOLAHAN
BY
ATTORNEY